Figure 2:
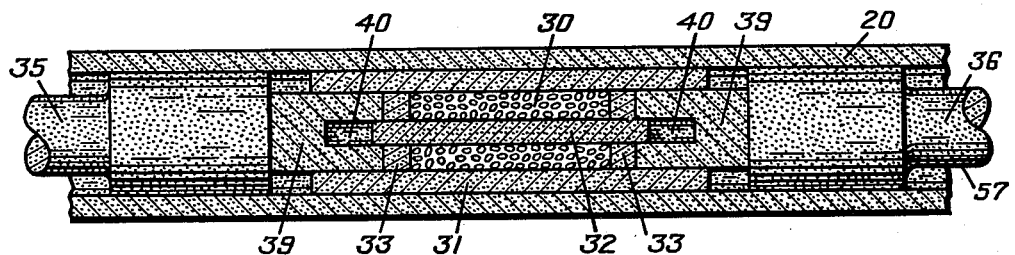

Aug. 31, 1937.    R. R. RIDGWAY ET AL    2,091,569
ARTICLE OF SELF BONDED GRANULAR MATERIAL AND METHOD OF MAKING THE SAME
Filed Sept. 30, 1935

Inventors
RAYMOND R. RIDGWAY
BRUCE L. BAILEY
By Clayton L. Jenks
Attorney

WITNESS
Franklin E. Johnson

Patented Aug. 31, 1937

2,091,569

UNITED STATES PATENT OFFICE 2,091,569

ARTICLE OF SELF BONDED GRANULAR MATERIAL AND METHOD OF MAKING THE SAME

Raymond R. Ridgway and Bruce L. Bailey, Niagara Falls, N. Y., assignors to Norton Company, Worcester, Mass., a corporation of Massachusetts Application September 30, 1935, Serial No. 42,839

10 Claims. (Cl. 25—156)

This invention relates to articles of self bonded refractory granular material and methods of making the same, and in particular to a bondless article made solely of the oxides of aluminum, magnesium, titanium, zirconium, thorium, cerium, or chromium, as well as mixtures thereof, or various refractory compounds of high melting points, such as mullite, which are particularly adapted for molding without the use of an intermediate bond in accordance with our procedure.

It has been customary in the ceramic industry to make a bonded article of crystalline alumina, for example, by mixing the refractory grains with water and a raw plastic ceramic bond comprising various clay materials, such as ball clay, slip clay, kaolin and feldspar in various intermixtures, then shaping an article from the wet plastic mass and finally firing it at a high temperature sufficient to mature the bond to a desired vitrified condition, whereby the bond is caused to adhere to the refractory grains and hold them together.

While such articles of bonded grains have great value in the industry, they are subject to well known defects. In the first place, the bonding clays reduce the refractoriness of the original material, since they must be matured at a temperature well below that of the melting point of the refractory grain being bonded. Also, the final article cannot be used at a temperature at all close to the softening point of the bond, and the highly refractory quality of the grain is thereby lost to a material extent.

A second defect is the result of the porosity which appears in the finished article because of the shrinkage of the maturing clays in the bond. The plastic ceramic material shrinks both during the drying operation, due to a loss of water and when it is fired to vitrification. Moreover, the ceramic bonds frequently develop porosity through the formation of gases during firing. Consequently, the resultant article has a certain unreducible porosity due to these shrinkages, even if the ratio of ceramic bond to the amount of the refractory material is adjusted to give the maximum density.

Furthermore, such articles lack homogeneity in structure, due particularly to the fact that the bonding material has different physical properties from those of the refractory grains. For example, the refractory metal oxide may be highly crystalline and very hard and wear resistant, while the bond is of a glassy nature and of much much lower hardness and resistance to abrasion. Where such refractory articles must resist heating and cooling as well as slag erosion and the like, this lack of uniformity in structure is likely to become a serious disadvantage.

It has also been proposed to melt various high temperature materials and cast them in the molten condition to a desired shape, such as by dipping a graphite mold in molten alumina and then cooling the filled mold in the outer atmosphere. But there are obvious disadvantages in the casting of materials which melt at such high temperatures, owing particularly to the lack of non-reactive materials which can be used for making the mold as well as problems inherent in the process. For example, the shrinkage of the material as it crystallizes during cooling is so great that the final product lacks uniformity in structure due to the presence of pipes and voids, and it is difficult to mold the mass to a required shape. Such cast bodies possess strains to a high degree, so that articles manufactured in this manner will very rarely stand reheating without severe spalling. Moreover, graphite is the best commercially available material which can be used for the mold, but the refractory oxides when melted will react with a graphite container and be reduced to metals, carbides, and suboxides which are non-refractory or unstable. Crystalline alumina forms these carbides and oxides to such an extent that the final article may even disintegrate. Magnesia when melted in a graphite container will react with the graphite and if not held under pressure will boil away. The surfaces of such articles are corroded and covered with craters and pits. These various changes in the refractory oxide as produced by reaction with the carbon are highly objectionable and the article is of little utility. Also, such a casting process is not capable of use in the production of small articles and particularly where accurate dimensions are required, since it is impossibe to carry enough superheat in the molten mass to permit it to be cast in the small size. That is, owing to the quick chilling and the cooling of the surface of the material before it can be fully and properly shaped, the casting of such materials is limited to the production of large scale articles, such as glass tank blocks and large bricks.

Various schemes have been tried for molding alumina in a so-called sintering operation, such as whereby a slip of the material suspended in hydrochloric acid in an extremely finely divided condition is molded to a desired shape in an absorbent mold after which the dried cast body is fired at 1400° to 1600° C. to cause a sintering of the alumina particles at their contacting surfaces. Such an article has many defects, owing particularly to its porous nature and the strains set up in the structure by the sintering operation.

The metal oxides commonly used as refractory materials are alumina, zirconia, titania, magnesia, and mullite, the latter being here considered a double oxide of aluminum and silicon. Each of these oxides is characterized by a melting point above 1800° C. and in the case of magnesia, the melting point is as high as 2800° C. Each reacts with carbon at its melting point. The other metal oxides above listed are also refractory and possess these various properties to such an extent that they may be classed therewith for the purposes of this invention.

The primary objects of this invention are to produce a bondless refractory article consisting solely of one of the above specified refractory metal oxides of a high melting point, and particularly to make a product wherein the material is crystallized in a continuous, one component structure which has a random orientation of crystal faces and is substantially free from crystalline cleavages and other detrimental properties. A further feature lies in getting the product of a required density and especially one which is substantially non-porous or of maximum density and, therefore, impermeable to gases and liquids.

In accordance with our invention, these refractory metal oxides are heated to a plastic condition and molded under high pressure. However, because of the high melting point of the various oxides, the only commercially available and satisfactory material for use as the mold is graphite; but carbon reacts with the molten oxides with the detrimental results above mentioned. A further object of this invention is, therefore, to provide a method of molding the refractory metal oxide under conditions which prevent a detrimental reaction between the mold material and the metal oxide being molded and produces an article of required physical and chemical properties. Other objects of the invention will be readily apparent.

The primary discovery underlying this invention is based upon the fact that the objectionable reaction between graphite and any of the above mentioned refractory metal oxides is accelerated and becomes significant only as the oxide approaches closely to its melting point. At a temperature only slightly below this melting point, the reaction is limited to the contact surface of the material and any detrimental effects are here present, if at all, only in a very thin surface layer. If the metal oxide is properly controlled in its composition, with particular reference to the impurities present therein, it is found to approach a plastic stage just prior to its melting point, during which the material in a finely divided condition may be caused to flow and autogenously bond together under a high pressure. It may be assumed that, at the myriads of contact surfaces between these fine powders, a localized pressure is set up which promotes the liquefaction of the crystalline metal oxides at a temperature slightly below the melting point. Hence, the application of pressure causes the material to become plastic at a temperature slightly below its melting point and sufficiently low so that this reversion to the liquid phase cannot cause chemical reaction with graphite.

Therefore, in accordance with our invention, we mold the refractory metal oxide under a high pressure and at a temperature near its melting point where it is sufficiently plastic to be moldable under the pressure applied; and the temperature is so controlled, as well as the duration of contact of the plastic oxide with the mold, that the metal oxide is incapable of reacting with or dissolving the mold material to a detrimental extent, or of permeating the mold pores and making separation difficult or of escaping through the crevices of the hot expanded mold parts. The temperature, pressure and time elements of the process are so regulated as to produce the required physical properties, and with particular reference to density and crystallinity.

The preferred procedure involves heating the material in a suitable finely divided condition while being subjected to a high pressure in the mold and then, when the material has been compacted to its required shape, cooling it quickly to a sufficient extent to avoid reaction with the mold material. Thus, if the material has been heated up to the melting point, its contact with the mold walls, while in such reactive condition, is but momentary and the detrimental reactions can be only surface deep. Hence, the invention contemplates broadly the idea of molding the metal oxide under pressure while sufficiently fluid for the purpose, and even momentarily molten, provided the temperature is lowered quickly to a safe point as soon as the mass has been molded to the required shape and density and has assumed a substantially continuous crystalline structure. It is preferable however to so control the temperature that it does not reach the melting point, and to insure that substantially no surface reaction takes place. This is the ideal condition to be approached as closely as is practical when working on a commercial scale. The pressure is preferably high, and ordinarily between 100 and 10,000 pounds to the square inch, depending upon the material being molded.

In the preferred practice of this invention, the mold is made of graphite of extra high quality stock with the minimum of porosity. The mold is made in the manner of an ordinary die cast mold with a slidable plunger wherein the finely divided metal oxide is confined and compacted while being heated to the required temperature. A sufficient pressure is imparted to the plunger to force the material into the required dense condition before it has been heated to its melting point. This may be accomplished by various types of structure adapted for heating the mold and applying the required pressure, and particularly by the aid of an electric resistance furnace within which the mold is heated. Since the mold is preferably made of graphite, the mold body may constitute a part of the electric resistor itself.

Figure 1:
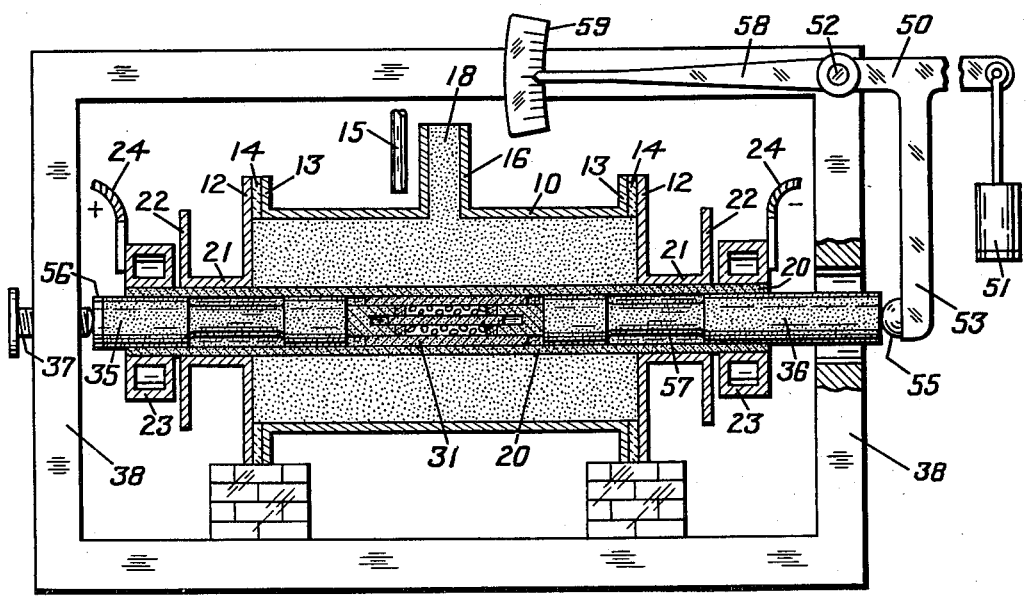

One form of apparatus which is adapted for making such articles as illustrated in the accompanying drawing, in which:

Fig. 1 is a vertical section, with parts broken away, of an electric furnace and mold arranged for forming a cylindrical body of the refractory metal oxide; and Fig. 2 is an enlarged detail, partly in section, of the graphite mold parts shown in Fig. 1.

As illustrated, the furnace comprises a cylindrical metal shell 10 of suitable dimensions which with metal end walls 12 forms a heat-insulating and protective casing for the graphite resistor and mold parts. The cylindrical shell has end flanges 13 which are bolted or otherwise secured to the walls 12, but the shell is insulated from the end walls by suitable insulating rings 14 therebetween. A stream of water may be applied through the tube 15 or other suitable device for cooling the shell of the furnace and the ends of the resistor. A pipe 16 fastened to the upper portion of the shell 10 serves for the introduction of insulating material and the exit of gases generated or expanding therein. An optical pyrometer may be suitably located within this pipe, or it may be otherwise incorporated in the apparatus.

In order to form a proper support for a graphite resistor tube 20, the end plates 12 are each made integral with a cylindrical sleeve 21, which in turn is fastened to an upright flange 22 forming spool-like ends. The sleeves 21 serve as bearing supports for the graphite resistor 20, while the flanges 22, together with the flanges 13, prevent water from contacting with the electric terminals. The graphite resistor 20 projects outwardly beyond the sleeve 21 and has fastened at its opposite ends the water-cooled terminals 23 to which are connected the lead-in cables 24 for supplying electric current thereto. Except as herein described, the various parts of this furnace may be made in accordance with standard construction, as is well known in the art. It will, for example, be appreciated that the dimensions of the resistor tube 20 will be determined in accordance with the temperature requirements of the furnace.

The hollow graphite resistor tube 20 is surrounded by a mass of pulverulent lamp black or other suitable material, which is fed into the furnace as required through the tube 18. This material being of the same chemical nature as the graphite resistor 20 serves to surround the resistor tube with an inert environment and to prevent the tube 20 from being oxidized. Any air entrapped therein will be converted to non-oxidizing gases.

This invention contemplates placing a definite, weighed amount of the refractory metal oxide powder of required granular size in a mold of predetermined dimensions and heating and compressing the same until it has assumed the required density. While various mold constructions may be employed within the scope of this invention and as required for shaping the different types of articles, the form shown is typical of mold constructions which are serviceable in this type of furnace. As there shown, the resistor 20 has a cylindrical inner surface of accurate dimensions, and it is so arranged that the mold parts may be slidably mounted therein. The resistor and the mold parts are preferably made of the best available graphite material, of the so-called "extra quality", which is strong and has been processed to a maximum density, such as is used for electric furnace electrodes. This material is substantially pure carbon, with only negligible amounts of ash constituents. It is capable of being machined to accurate dimensions.

The mold shown in the drawing is serviceable for making a hollow, cylindrical article from a mass of the metal oxide powder 30. This mold comprises a cylindrical sleeve 31 and a cylindrical core 32 of graphite, together with ring-shaped end walls 33 which are slidably mounted within the sleeve 31. The mold space, formed by the sleeve 31, the core 32 and the rings 33, serves to contain the granules 30 and defines the shape of the compacted article. The rings 33 fit loosely within the sleeve 31 and accurately and tightly around the highly polished core 32 and serve as a compression packing which lessens the strain on the central core. They also prevent the metal oxide in its softened condition from escaping from the mold chamber.

In order to apply pressure to the granules as they are being heated, one or more plungers, which are likewise made of refractory material, and preferably graphite, are fitted for sliding movement within the resistor 20. Two plungers 35 and 36 are illustrated, one of which may be stationary and the other movable, or both may be movable. Improved results are obtained by pressing the powder from both ends. The left-hand plunger 35 is shown in Fig. 1 as mounted merely for adjustable movement within the resistor 20, which is accomplished by the screw 37 in the framework 38. This adjustment serves to locate the granular material within the hottest zone of the furnace, as determined by the size of the article to be formed.

In order that the movement of the plungers may be properly transmitted to the granules 30 in the mold space, it is preferable to employ intermediate plunger blocks 39, each of which is engaged by the inner ends of one of the plungers and is provided with a recess 40 which fits loosely over the ends of the core 32 projecting through the disk 33 and thus slides thereon. These blocks fit accurately and tightly within the sleeve 31 and so cooperate with the rings 33 to confine the grains within the mold space. Consequently, pressure applied to the plungers 35 and 36, as indicated in Fig. 1, will cause the blocks 39 to force the rings 33 towards each other and thus compact the metal oxide granules therebetween.

The application of a measured pressure and the indication of the movement of the plungers may be effected, as shown in Fig. 1, by means of a lever arm 50 carrying a suitable weight 51. The lever is fulcrumed on a pin 52 mounted on the framework 38 and has an arm 53 which in turn applies pressure to the right-hand plunger 36 through an intermediate insulating member 55 resting against the end of the graphite plunger. A further insulating block 56 may be placed between the plunger 35 and the screw 37. It will be observed that the plunger 36 has a considerable sliding contact with the inner surface of the resistor 20, but it may be reduced in cross-section, as at 57, in order to cut down the sliding resistance. In order to observe the movement of the plunger, a pointer 58 forms an extension of the lever arm 50 and rides over a suitably graduated scale 59 mounted on the frame. The parts are so arranged that the furnace operator may watch the movement of the scale pointer 58 and stop the electric current flow when the pointer indicates the proper temperature and pressure conditions.

In the operation of this furnace and the manufacture of a molded article, the exact conditions will be determined by the nature of the refractory material used and the size and density of the finished product. To make a small hollow cylinder of crystalline alumina which has substantially the maximum obtainable density and is accurately shaped, it is preferable to adopt the following procedure. Alumina in crystalline form and of high purity is selected, it being noted that the material should be in a preshrunk condition and devoid of water of hydration or of crystallization. High purity of material is desirable in both cases, but considerable latitude is, of course, allowable. Crystalline alumina as obtained by the procedure of the U. S. patent to Ridgway No. 2,003,867 may be used for the purpose because of its high purity. It is initially crushed to a very fine size and probably one which will pass through a screen of 200 meshes per linear inch. It may comprise a mixture of fine and coarse sizes to avoid a large plunger movement, but there should be enough fine material to fill the spaces between the coarse particles. This material should be carefully treated to remove traces of metallic iron, if produced in the process of pulverizing, such as by means of magnetic separators and other suitable treatment. A definite weighed amount of this material, as predetermined by suitable calculations, is placed in the mold cavity formed by the sleeve 31, one of the rings 33 and the core 32, after which the other ring 33 is assembled on the core and the parts are slidably mounted within the resistor 20. Then, the plunger rods 35 and 36 and the blocks 39 are properly assembled in place. The material may be preliminarily pressed to shape in the mold or prior to its being placed in the mold, thus lessening the plunger movement and otherwise improving the casting operation. Upon the application of electric current of suitable voltage and amperage, the resistor tube 20 and associated parts will be rapidly heated to the required temperature. If desired, the plunger movement may be so controlled that a definite amount or weight of grains, which has been calculated to occupy a desired volume percentage of the final product, will be caused to occupy that volume in the shaped body, so that the porosity will likewise constitute a desired volume. The plunger may be restrained in its movement by any suitable device arranged for the purpose.

The pressure to be applied to the material will depend upon the grain size, the size of the article to be made and the density desired, as well as the nature of the refractory metal oxide being molded. For example, a dense piece of alumina three inches long by one inch in diameter may be satisfactorily molded at a pressure of 500 lbs. per square inch, but a higher pressure may be used if desired. Also a lower pressure of 50 to 100 pounds per square inch will suffice to make an article of low density. Under the heavy pressure applied, the finely divided grains of refractory metal oxide coalesce and fill the voids, and the gases of reaction which may form percolate through the semi-porous graphite mold. At the instant that the combination of heat and pressure has consolidated the material, the temperature is immediately lowered before the metal oxide can react in a deleterious manner with the walls of the container. The temperature will need to be lowered only a relatively small amount to prevent this reaction. In the case of crystalline alumina which melts at approximately 2050° C., the pressure molding operation may take place in the vicinity of 2025° C. or even nearer to the melting point, and a reduction in temperature of 25° to 50° C. after the material has been consolidated will be sufficient to prevent any material amount of deleterious reaction. Mullite, one of the aluminum silicates, may be molded at about 1800° C., its melting point being 1810° C. Magnesia, zirconia, and the other refractory metal oxides are likewise molded just below the melting points. After the material has been cooled through this necessary low temperature change, then the further cooling may take place slowly, and the molded article may be subjected to a desired annealing action within the furnace. That is, the article may be quenched by quick cooling or it may be annealed over a cycle lasting for many hours, whichever is desired. It is a feature of this invention that the size and nature of the crystals produced in the article may be thus controlled by so varying the cooling procedure. It may also be observed that it is sometimes desirable to permit a slight surface reaction. For example, a slight coating of a carbide on the surface of the article will help to free the shaped mass from the mold. If the temperature and pressure are too high, the molded mass penetrates the pores of the graphite mold and so makes it necessary to break or grind away the graphite mold. Control of temperature and pressure minimizes this loss by breakage. The piece as thus molded will have an apparent density of 3.98 or approximately the density of pure crystalline alumina which is ordinarily assumed to be 4.0. The piece of alumina as thus made is free from carbides and suboxides and similar objectionable compounds, although there may be a surface discoloration due to contact with the graphite mold and possibly a very thin skin of reaction products.

The determination of the temperature may be made by an optical pyrometer or other suitable temperature measuring device, but it is feasible merely to watch the movement of the needle 58 and stop the current flow when the scale indicates the desired end of the molding operation. Pressure may be maintained on the plunger by means of hydraulic or pneumatic mechanism if desired, or by the weight and lever shown. As the temperature is gradually raised by the electric current passing through the resistor, the plunger moves in very gradually at first as the material becomes heated, but when the material approaches its melting point and is becoming plastic, the plunger moves more rapidly. This movement is watched carefully, and when that rapid movement starts to take place, the electric circuit is broken and the furnace is quickly cooled, as by means of a shower of water on the metal casing surrounding the furnace parts, until the temperature is safely below that at which reaction may take place. The control may however be made more accurately, if required, by means of temperature measuring apparatus. If the temperature is allowed to get too high, then aluminum carbide is formed. Also, the molten material would squirt out between the plunger and the casing walls and thus would be lost as well as possibly cause a serious accident.

If there are any impurities in the alumina which have a high affinity for carbon, such as the oxide of calcium or other alkalies, the product will also contain objectionable carbides of these metals. It is, therefore, desirable that the refractory metal oxide be so selected as to purity and quality that these lower melting easily reactable constituents are not present. For example, crystalline alumina made from Bayer process alumina has a high degree of purity in all respects except that of its soda content; but because of this soda, it is not as well adapted for this molding operation as are the products which are free from it. Hence, this Bayer process alumina should be so treated as to remove its soda content and make it suitable for the purpose. It is of course possible to mold this and other forms of impure alumina by the present invention, although the quality of the finished product relative to its density and refractory nature is not wholly satisfactory for many purposes.

An article made of crystalline alumina of high purity as above described has a modulus of rupture in compression of about 90,000 lbs. per square inch. This is substantially equal to that shown by a unit crystal of the pure material, and it indicates that the physical character of the molded article approaches that of a homogeneous monocrystalline body. It is, therefore, apparent that by this process we have made a crystalline phase, one component body of refractory metal oxide which has the shape and dimensions required and the composition of the original material.

An article made of crystalline alumina molded in accordance with the present invention will serve many uses and particularly as a refractory body since it will withstand heavy loads or high compression at an extremely high temperature and far above the point at which the ceramic bonded bodies fail. The article may be used as a plate, dish, tube, bushing, brick and for many other purposes. Owing to the fact that the molded material does not have projecting cutting points and edges as would be presented by ceramic bonded crystals, it can be given a very high polish and shaped to provide a plane surface and so is useful as a bearing to serve in place of the expensive jewels heretofore used. Hence, it is highly serviceable for uses where a smooth surface of substantially non-wearable character is required, such as a wire drawing die, a blasting nozzle, a thread guide or a bearing. Likewise articles of commerce may be made from the other materials here mentioned. For example, molded zirconia and magnesia are excellent refractories and mullite is highly serviceable for use in spark plugs in gasoline fired motors. Other uses and advantages of these molded materials will be apparent to those skilled in the art.

By this invention, one may mold a large block of a refractory metal oxide and then cut it to desired sizes and shapes by means of a diamond cutting off wheel. Thus, one may make a large number of small thread guides by a single furnace operation. After being cut to size, the individual pieces can be shaped and polished by means of diamond, boron carbide or other lapping or polishing wheels. Similarly, a large molded tube may be cut into short pieces of various utilities.

In accordance with this invention, one may make a shaped article of refractory metal oxide, as above defined, which is characterized by having only a single component and a single substantially continuous, crystalline phase of conchoidal fracture. The mass is substantially free from integranular weakness or veins or inclusions of reaction products as might result from a reaction between the metal oxide and a graphite mold. It may have any desired density from a porous article, of such high porosity that it could be used as a porous filter plate or an abrading block or grinding wheel, to a dense body which is highly resistant to abrasion and capable of taking a high polish and so is useful where the property of smoothness is essential. Because of the absence of any second bonding component, its hardness and resistance to wear is that of a single crystal. The purity of the molded article will depend solely upon the nature of the material selected. Also, it is now possible to make an article of a molded shape which has an even greater strength than has an individual large grain of the material before molding. This increased strength is believed to be due in part to a random orientation of the crystals, whereas a single grain may possess cleavage planes and lines of parting.

We claim:

1. The method of making a shaped refractory article of an oxide of a metal of the group consisting of aluminum, magnesium, zirconium, titanium, thorium, cerium and chromium comprising the steps of enclosing the refractory metal oxide in a granular condition and of required purity in a mold space, heating the material, while subjecting it to pressure within the mold, to a temperature close to its melting point and at which it is plastic and compacting it into an integral mass, and then as soon as it has been compacted cooling the molded body to a point materially below its melting point.

2. The method of making a shaped refractory article comprising the steps of enclosing a definite amount of pulverized refractory metal oxide within a mold of reactive material, heating the material, while subjecting it to high pressure within the mold, to a temperature near its melting point at which it softens to a plastic condition and compacting it to the required density, and then as soon as it has been compacted cooling the mass quickly to a temperature materially below its melting point where detrimental reaction with the mold material is prevented and forming a solid body thereof.

3. The method of making a shaped refractory article comprising the steps of enclosing a pulverlent, reactive, refractory metal oxide within a graphite mold, heating the material, while subjecting it to pressure within the mold, to a temperature at which it is plastic, compressing the plastic mass to the required shape and quickly lowering the temperature to a point at which reaction between the metal oxide and the graphite cannot take place and thereafter slowly cooling the molded mass through an annealing zone and removing it from the mold.

4. The method of making a shaped refractory article comprising the steps of enclosing a definite amount of a pulverulent, reactive, refractory metal oxide within a graphite mold, heating and compressing the material within the mold and causing it to soften to a plastic condition below its melting point, shaping the mass within the mold at that temperature below its melting point at which substantially no reaction takes place between the metal oxide and the graphite, and then cooling it quickly to that temperature at which the mass solidifies to a non-reactive condition.

5. The method of making a shaped refractory article comprising the steps of heating a granular, reactive, refractory metal oxide under pressure in a graphite mold to a temperature at which the grains are caused to cohere and then lowering the temperature, as soon as the desired density has been attained, to a point at which reaction between the metal oxide and graphite does not take place, and heating and cooling the material quickly through the temperature zone of plasticity so as to minimize the reactions.

6. The method of making an article of mullite according to claim 4 comprising the step of heating said material in pulverulent condition while under pressure to a temperature below its melting point but in the vicinity of 1800° C. at which it is softened by pressure.

7. The method of making a refractory article comprising the steps of placing a predetermined amount of a granular refractory metal oxide in a graphite mold, electrically heating the mold within a resistance circuit, subjecting the material to high pressure within the mold, and then, as soon as the material has become plastic and compacted to a required density, breaking the electric circuit and cooling the mold to a temperature at which the metal oxide is not reactive with the mold to a detrimental extent, and thereby forming a crystalline, one phase, one component body of said metal oxide.

8. A shaped article of a refractory oxide of a metal of the group consisting of aluminum, magnesium, silicon, zirconium, titanium, beryllium, thorium, cerium and chromium characterized by a one component crystalline phase of the material molded under pressure and while plastic to required dimensions and shape and which has a high strength and a density close to that of an individual crystal, a random orientation of crystal faces and a conchoidal fracture.

9. A shaped article of crystalline alumina characterized by a one component crystalline phase of the material which has a density of nearly 4.0 and a modulus of rupture in compression of at least 90,000 pounds per square inch, and which is substantially free from aluminum carbide and other structure weakening impurities and has a random orientation of crystal faces and a conchoidal fracture.

10. The method of making a molded article of crystalline alumina comprising the steps of enclosing within a graphite mold a definite amount of pulverulent crystalline alumina of high purity, compressing the material within the mold under a pressure above 50 pounds per square inch, while heating it and causing it to soften to a plastic condition below its melting point, shaping the mass within the mold at that temperature below its melting point at which substantially no reaction takes place between the alumina and the graphite, and then cooling it quickly to that temperature at which the mass solidifies to a nonreactive condition.

RAYMOND R. RIDGWAY.
BRUCE L. BAILEY.